Patented Mar. 13, 1928.

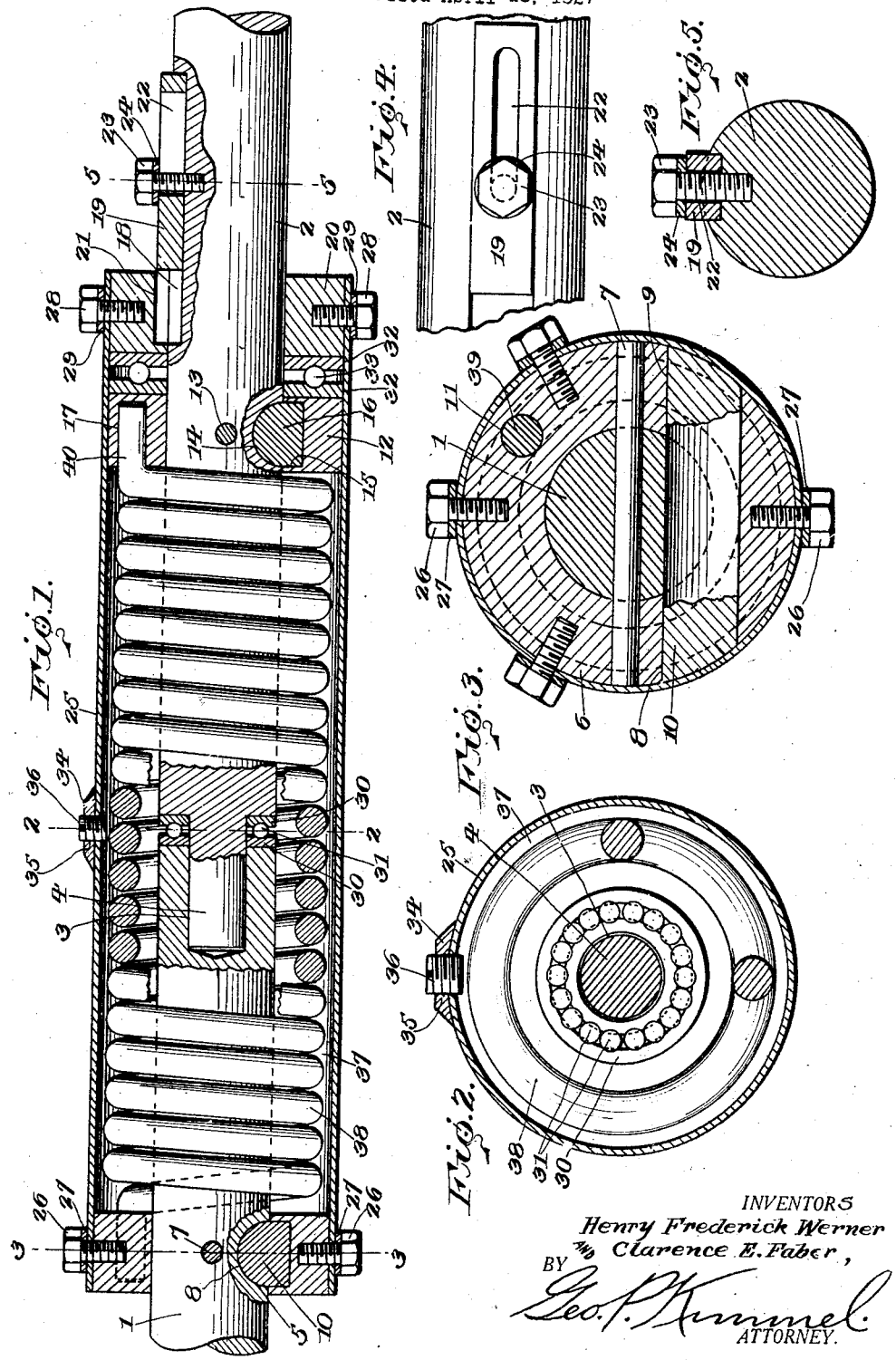

1,662,223

UNITED STATES PATENT OFFICE.

HENRY F. WERNER AND CLARENCE E. FABER, OF NEW ORLEANS, LOUISIANA.

SHOCK ABSORBER.

Application filed April 18, 1927. Serial No. 184,630.

This invention relates to a shock absorber designed primarily for use in connection with drive shafts of motor vehicles, but it is to be understood that a shock absorber, in accordance with this invention, can be employed for any purposes for which it is found applicable, and the invention has for its object to provide, in a manner as hereinafter set forth, a shock absorber for relieving after shock on the starting of a motor vehicle, to relieve the shock on a differential by a missing motor, to overcome the strain on a clutch when driving the vehicle on an uneven road surface, as well as for taking the strain and sudden shock off of universal joints, transmissions, clutches, motors, differential driving pinions, ring gears, differential gears, axle shafts and rear wheels.

Further objects of the invention are to provide, in a manner as hereinafter set forth, a shock absorber which is simple in its construction and arrangement, strong, durable, compact, thoroughly efficient in its use, readily installed, and comparatively inexpensive to set up.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a sectional elevation, of a shock absorber in accordance with this invention, applied to the drive shaft of a motor vehicle.

Figure 2 is a section on line 2—2 Figure 1.

Figure 3 is a section on line 3—3 Figure 1.

Figure 4 is a fragmentary view in top plan of a drive shaft section.

Figure 5 is a section on line 5—5 Figure 1.

A shock absorber, in accordance with this invention, includes a pair of body sections, interengaging with each other and resiliently connected together, and by way of example the body sections are illustrated as constituting a sectional drive shaft of a motor driven vehicle. One of the drive shaft sections is indicated at 1 and the other at 2. The section 1 is a rear section and the section 2 the front section of the drive shaft. The section 1 has its forward end provided with a socket 3 disposed axially thereof and into which extends a protuberance 4 formed on the rear end of the section 2. The socket 3 is cylindrical in contour and the protuberance 4 corresponds in contour to the shape of the socket 3. The protuberance 4 is of greater length than the length of the socket 3 and is disposed axially of the rear end of the section 2. The section 1 is formed in its periphery with a groove 5 of semi-oval cross section and segmental in lengthwise section. Mounted on the section 1 and enclosing the groove 5 is a collar 6 and which is secured to the section 1 by a transversely extending pin 7 having its ends flush with the periphery of the collar 6, and further with the pin extending through the section 1 at the diametric center thereof. The body of the section 6 is formed with a pair of opposed openings 8, 9, and each of which in cross section is of rectangular contour. The openings 8, 9 register with the groove 5 and extending through said openings and groove is a key 10 which snugly fits the walls thereof and further has its ends flush with the periphery of the collar 6. The collar 6 has the body thereof provided with a transversely extending socket 11 which opens at the inner side of the collar.

Mounted on the section 2 is a collar 12 and which is secured to said section 2 by a diametrically extending pin 13 having its ends flush with the periphery of the collar 12, in the same manner as shown in Figure 3 with respect to the pin 7. The section 2 is formed with a peripheral groove 14 of semi-oval cross section and segmental in lengthwise section. The body portion of the collar 12 is formed with openings in the same manner as the openings 8, 9 are provided in the collar 6, and the openings in the collar 12 register with the groove 14 in the same manner as the openings 8, 9 register with the groove 5. The openings in the collar 12 are of rectangular cross section and one of said openings is indicated at 15. Extending through the openings in the collar 12, as well as the groove 14, is a key 16 which snugly engages the walls of the openings and groove. The key 16 is set up in the same manner as the key 10 with respect to the collar 6. The collar 12 is formed in the body thereof, with a transversely extending socket 17 which opens at the inner side of the collar 12.

The periphery of the section 2 is formed with a lengthwise extending rectangular recess or pocket 18 in which is slidably mounted a key 19 of a thickness greater than the depth of the pocket 18. Mounted on the section 2 is a collar 20 having its inner face formed with a groove 21 which opposes the pocket 18. The key 19 is adapted to be positioned in the groove 21, when desired, for the purpose of coupling the collar 20 to the section 2 so that the collar 20 will be bodily carried by the section during the operation of the drive shaft. The key 19 is formed with a lengthwise extending opening 22 and extending therethrough is a cap screw 23 carrying a lock washer 24. The screw 23 engages in the section 2 and connects the key 19 therewith. The opening 22 in connection with the screw 23 provides for the adjusting of the key 19 towards and from the collar 21. When the key 19 couples the collar 20 to the section 2 the screw 23 is adjusted in a manner to securely maintain the key 19 from shifting.

Surrounding the collar 6 and extending to and surrounding the collar 20, is a sleeve 25 which is secured to the collar 6 by a series of cap screws 26 provided with lock washers 27. The screws engage in the collar 6 and extend through the sleeve 25. The sleeve 25 is secured to the collar 20 by a series of cap screws 28 provided with lock washers 29 and said screws 28 extend through the sleeve 25 and engage in the collar 20.

Interposed between the sections 1, 2 is a thrust bearing consisting of a pair of race members 30 which are mounted on the protuberance 4 and have interposed therebetween bearing balls 31. The race members 30 have their outer diameter the same as the diameter of the sections 1, 2.

The collar 12 is spaced from the collar 20 but is arranged in close proximity thereto, and interposed between the collars 12 and 20 is a thrust bearing formed of a pair of race members 32 having interposed therebetween bearing balls 33. The outer diameter of the race members correspond to the outer diameter of the collars 12 and 20. The sleeve 25 is formed with a peripheral boss 34 positioned approximately at the transverse median of the sleeve and the latter is formed with an opening 35 which extends through the boss 34. The wall of the opening 35 is threaded and engaging therewith is a peripherally threaded plug 36. The opening 35 is provided for the supplying of lubricant to the chamber 37 formed by the sleeve in connection with the collars.

Surrounding the sections 1, 2 and positioned within the chamber 37 is a shock absorbing member or element, in the form of a coiled spring 38 having its coils spaced from the inner face of the sleeve 25. The spring 38 extends from the collar 6 to the collar 12 and is formed with a pair of angularly disposed ends 39, 40 extending lengthwise with respect to the sleeve 25. The end 39 is mounted in the socket 11 and the end 40 in the socket 17. The spring 38 provides a resilient coupling between the sections 1, 2.

The function of the key 19 is that in the event the spring 38 should break, the key 19 can be shifted from the position shown in Figure 1 to engage in the groove 21 and after being secured in its shifted position, the sections 1 and 2 are coupled together to form a solid unit and the operation of the car can continue until the spring is replaced. The normal position of the key 19 is as shown in Figure 1 and it is not shifted to such position until it is employed for coupling the sleeve to the section 2 so that the sections will operate as a unit when the spring 38 is broken.

The device functions to take the shock off of universal joints, transmissions, clutches and motors as well as to take the shock off of differential driving pinions, ring gears, differential gears, axle shafts and rear wheels, and therefore it is thought the many advantages of a shock absorber, in accordance with this invention, can be readily understood, and although the preferred embodiment of the invention is as illustrated and described, yet it is to be understood that changes in the details of construction can be had which will fall within the scope of the claims hereunto appended.

What we claim is:

1. A shock absorber comprising a pair of body sections positioned in endwise opposed relation, a thrust bearing interposed between said body sections, a pair of spaced collars mounted on one of said sections and one fixed and the other normally loose with respect to said section, a collar fixed to the other sections, a sleeve secured to said last mentioned collar and to said normally loose collar, means for connecting said normally loose collar to its body section, a coil spring surrounding said body section and having one of its ends extending into said fixed collars and its other end into the other of said fixed collars.

2. A shock absorber comprising a pair of body sections arranged in endwise opposed relation and interengaging with each other, a collar mounted on each of said sections, a pin for securing the collar to its respective section, a key for securing a collar to its respective section, each of said collars formed with a socket, a resilient coupling member surrounding said body sections and having one end extending into one of said sockets and its other end extending into the other of said sockets, a normally loose collar mounted on one of said sections and spaced from the fixed collar carried by said section, a sleeve secured to the other fixed collar and to said loose collar and enclosing said resilient element, and means for securing said loose collar to its respective section to provide for said sections operating as a unit when the resilient element fails to perform its coupling function between the sections.

3. A shock absorber comprising a pair of body sections in endwise opposed arrangement, one of said sections provided with a socket and the other with a protuberance extending into the socket and of greater length than the length of the socket, said socket and protuberance arranged at the opposed ends of said sections, a thrust bearing interposed between the opposed ends of said sections, a collar mounted on each of said sections, plural means for securing each collar to its respective section, a coiled spring surrounding said sections and having one end extended into one of said collars and the other end extended into the other of said collars and providing a resilient coupling connection between said sections, an annulus loosely mounted on one of said sections and in proximity to the collar thereon, a sleeve secured to the collar on the other of said sections and to said annulus, and means for securing the annulus to its respective section to provide for said sections moving as a unit when said spring fails to perform its coupling function between the sections.

In testimony whereof, we affix our signatures hereto.

HENRY F. WERNER.
CLARENCE E. FABER.